Figure 1:
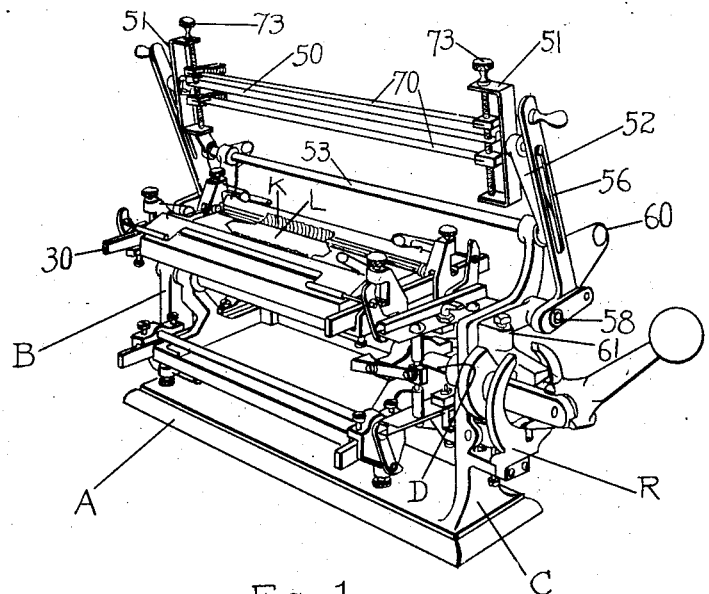

H. F. PERKINS.
FOLDING MACHINE.
APPLICATION FILED MAR. 6, 1917.

1,260,031.

Patented Mar. 19, 1918.
5 SHEETS—SHEET 1.

INVENTOR.
Henry F. Perkins,
BY
Gardner W. Pearson
ATTORNEY.

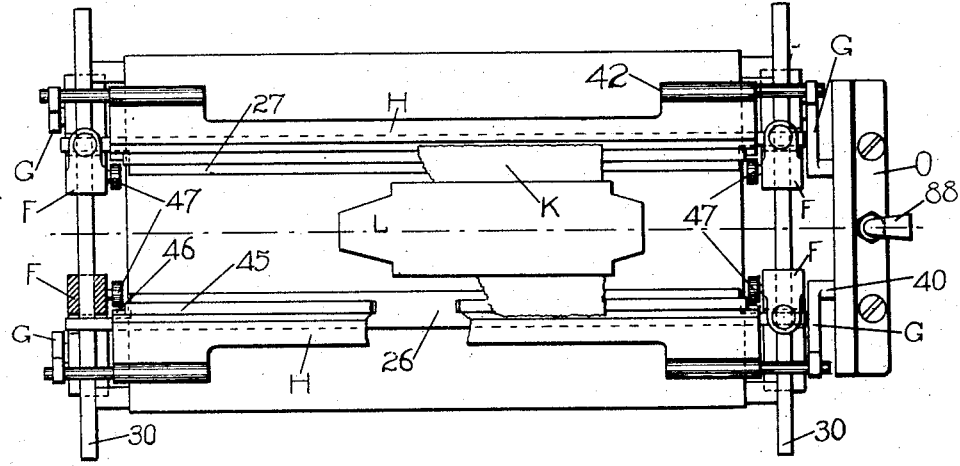

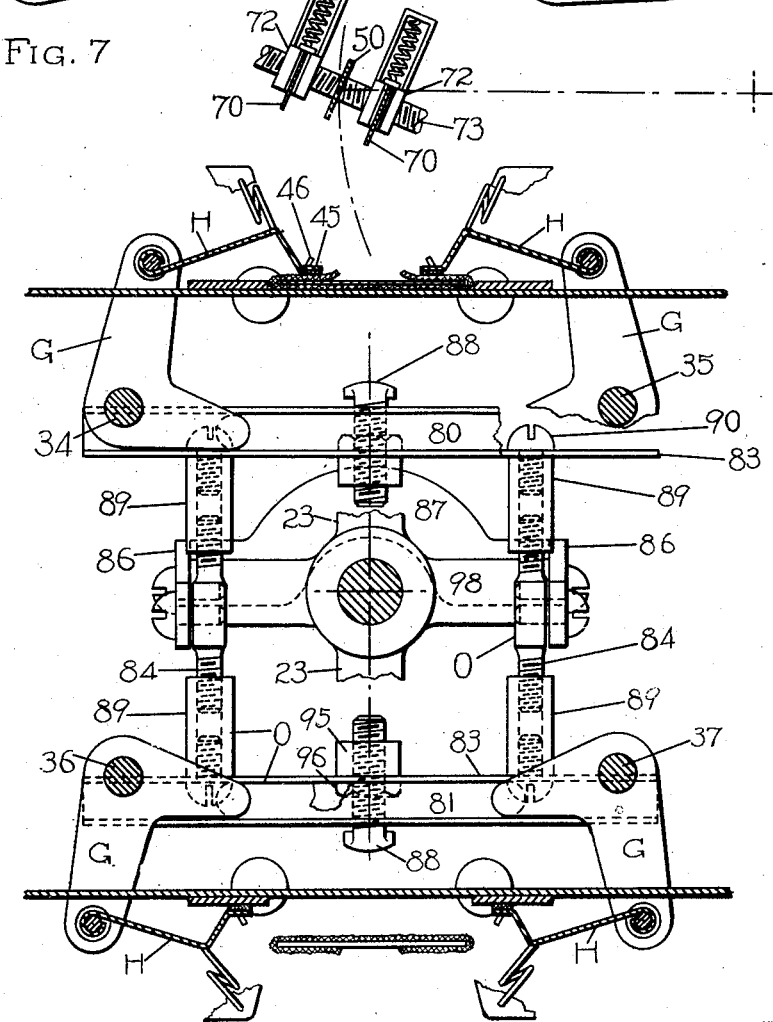

H. F. PERKINS.
FOLDING MACHINE.
APPLICATION FILED MAR. 6, 1917.
1,260,031.
Patented Mar. 19, 1918.
5 SHEETS—SHEET 4.
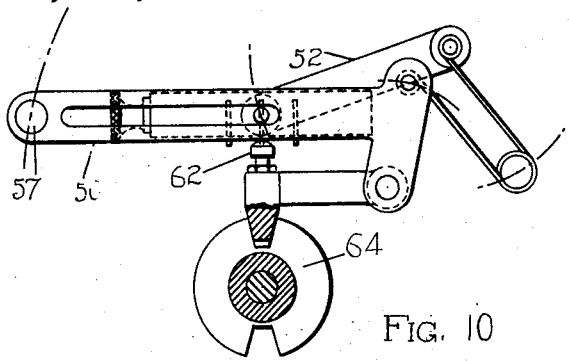
FIG. 10
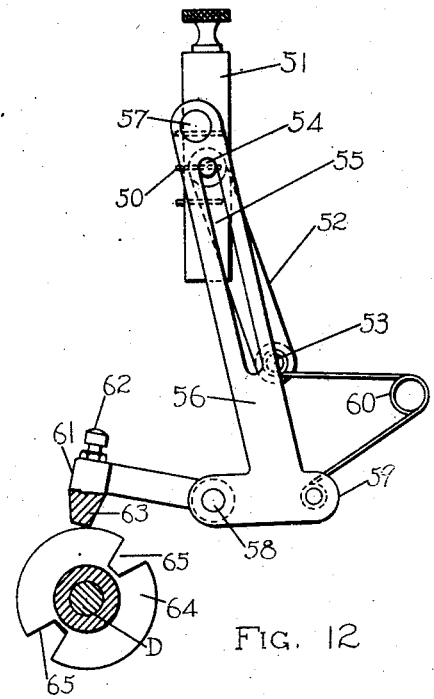
FIG. 12
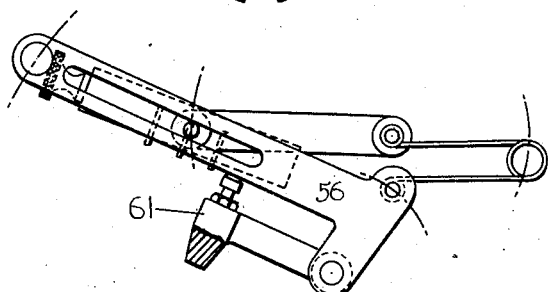
FIG. 11
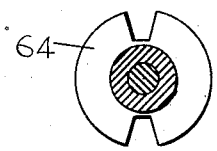
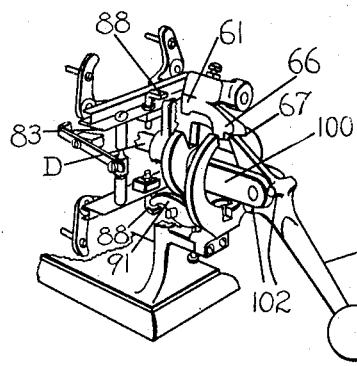
FIG. 13
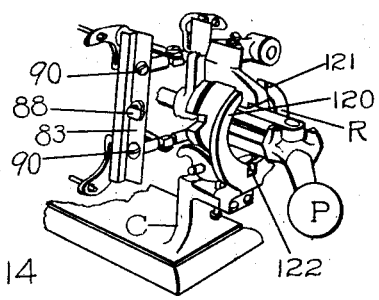
FIG. 14
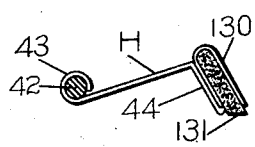
FIG. 15
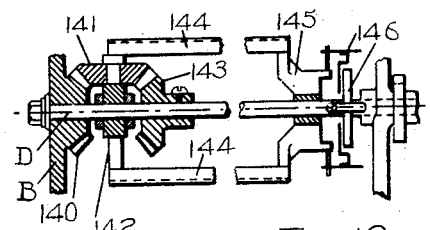
FIG. 16
INVENTOR.
Henry F. Perkins,
BY
Gardner W. Pearson
ATTORNEY.

H. F. PERKINS.
FOLDING MACHINE.
APPLICATION FILED MAR. 6, 1917.

1,260,031.

Patented Mar. 19, 1918.
5 SHEETS—SHEET 5.

INVENTOR.
Henry F. Perkins
BY
Gardner W. Pearson
ATTORNEY.

UNITED STATES PATENT OFFICE.

HENRY F. PERKINS, OF ANDOVER, MASSACHUSETTS.

FOLDING-MACHINE.

1,260,031.

Specification of Letters Patent.

Patented Mar. 19, 1918.

Application filed March 6, 1917. Serial No. 152,963.

*To all whom it may concern:*

Be it known that I, HENRY F. PERKINS, a citizen of the United States, residing at Andover, in the county of Essex and State of Massachusetts, have invented certain new and useful Improvements in Folding-Machines, of which the following is a specification.

This invention is for stretching a sample of cloth smoothly over the face of a sample card and for folding either the front or back edge or both around on to the reverse of such a card which carries paste and for pressing the edges and paste into holding relation.

It is shown as manually operative and as having the paste applied by hand, but these operations may be made automatic if desired.

All parts are adjustable for various sizes of cards and sample pieces.

Its purpose is to provide accurate attachment of the cloth to the card by folding and pasting, and to discharge the finished card with as few motions as possible by the operator.

It comprises, particularly, folding means which fold over the cloth, smooth it and press it firmly onto the paste; a single card holding device which holds the card and cloth firmly on the center line but allows the cloth to be stretched and smoothed at the front and back without curling the card.

It preferably includes oppositely disposed revoluble card holding tables each of which carries a set of folding means so connected by a shipper plate that they can be adjusted for different sizes, the shipper plate being so arranged that its movement in one direction operates one set of folders and returns the other set to receiving position thus releasing the finished card.

It also preferably includes operating means which includes one pivoted handle revoluble with the tables. The pivotal motion of this handle first operates the folding means and its continued pivotal motion immediately thereafter releases the card holding means, while its revoluble action thereafter revolves the tables and brings the bottom one up to operative position for the next card.

Other features of my invention are the gage strips which indicate where the card is to be placed and which prevent the finished card from following the folders back and failing to be discharged; the crescent guide which guides the operating handle in such a manner that it is almost impossible for the operator to make a false movement; and the notch in a lock disk carried by the main shaft, which in connection with a gravity pawl, locks the parts in position.

Figure 2:
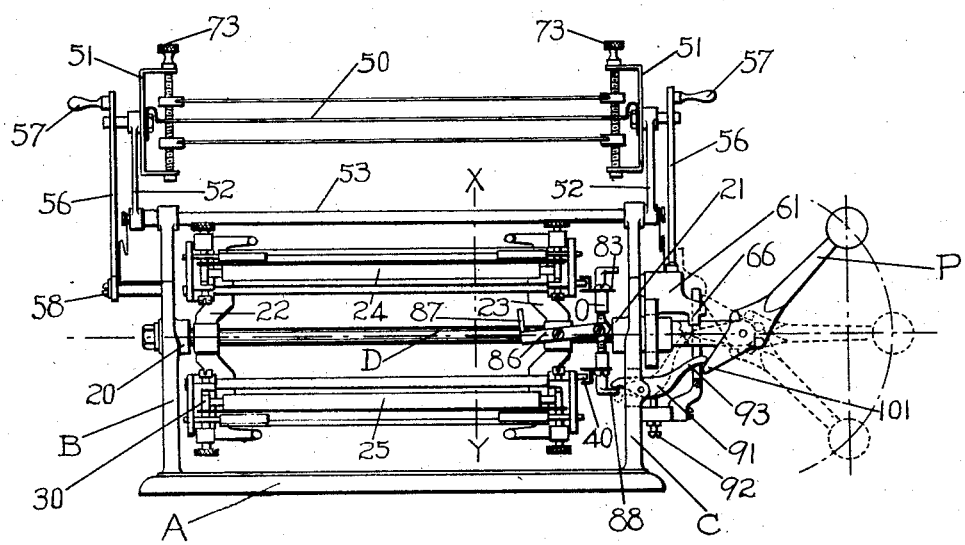
Figure 17:
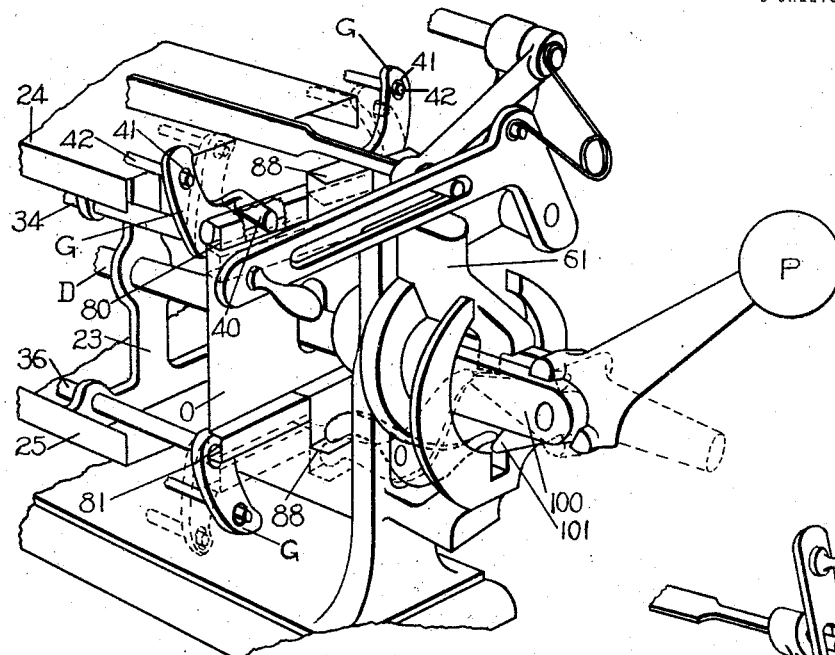
Figure 18:
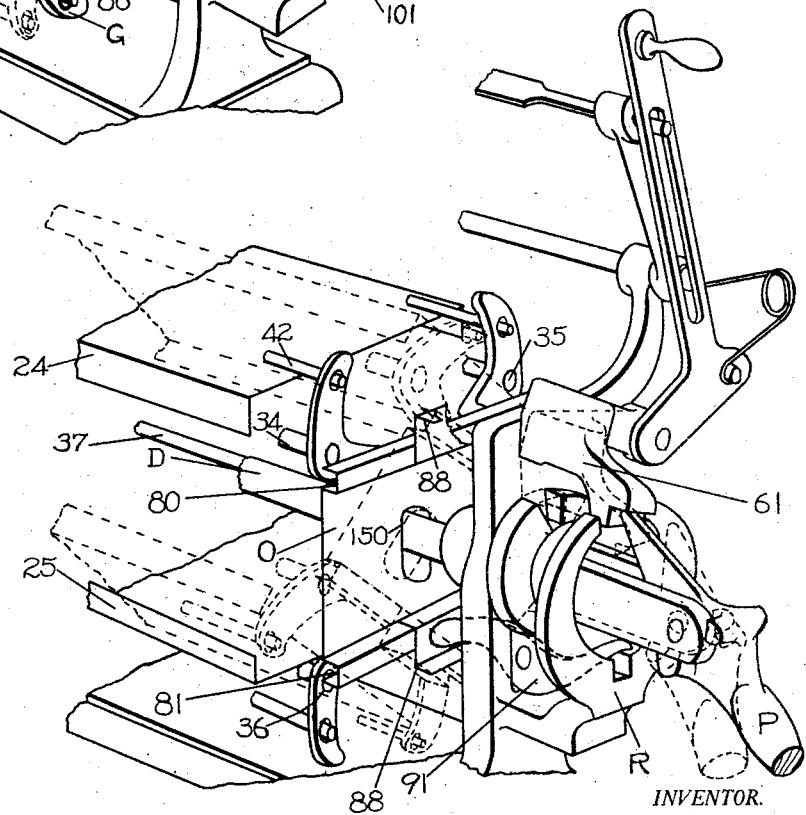

In the drawings Figure 1 is a perspective view showing the machine as it receives the sample card and cloth. Fig. 2 is a front elevation of the machine in the same position. Fig. 3 is a plan view of a table, carriages, folding blades and top of shipper plate, other parts being omitted for clearness. Fig. 4 is an enlarged detail of an adjustable card holding bar. Fig. 5 is a front elevation, enlarged, of a carriage. Fig. 6 is an enlarged side sectional elevation on line X Y of Fig. 2 looking from the left of the folding devices, bell crank and part of the shipper plate with the parts in position to fold and the card holding means in holding position. Figs. 7 and 8 are enlarged detail side elevations showing different positions of the folding means. Fig. 9 is a view similar to Fig. 6 except that it shows the top folding means as just operated, the bottom folding means retracted and the card holding device out of engagement. Figs. 10, 11 and 12 are details showing various positions of the arms which operate the card holding device together with the locking means for the main shaft. Figs. 13 and 14 are perspective views of the handle, the locking mechanism and the shipper plate shifter with the parts in different positions, the frame and some other parts being broken away for clearness. Fig. 15 is a detail showing another friction device for a folding blade and Fig. 16 shows a system of gearing by which a full turn of the operating handle will turn the tables more than once. Figs. 17 and 18 are perspective views from the right of part of a machine of modified and simplified form in which substantially all adjusting features as well as the folding blades and springs, guide strips, and side card-holding bars are omitted and in which the successive positions of the parts are shown by full and dotted lines.

A is the base of the machine. and B, C are standards fixed at each end thereof. Revoluble in suitable bearings 20 and 21, in standards B and C is main shaft D to which are fixed the spiders 22 and 23 which support the oppositely disposed tables 24 and 25, as shown in Figs. 1, 2, 17, and 18.

At the side of each table and firmly fixed thereto or integral therewith, is a carriage rail such as 30, as shown in Figs. 3, 5 and 6. Each rail 30 supports two carriages such as F shown in Fig. 5, which can be adjusted in position thereon by means of set screws 31, 32, and 33. Each carries the bearings for a shaft such as 34, 35, 36 or 37 which extends from one side to the other of the table and is supported by bearings in a similar carriage at the other side.

Each shaft, which I will call the bell crank shaft 34, 35, 36, 37 carries fixed thereto a bell crank such as G, each of which has at one end a boss 40 and at the other end a hole 41 to receive a folding blade shaft 42, as shown in Figs. 7 and 8. One of the important features of my device is that hole 41 is considerably larger than shaft 42 whereby there is a loose motion, the purpose of which I will describe hereafter.

Each folding blade shaft has pivoted thereto a folding blade H which consists of a strip of sheet metal, one edge 43 being bent around shaft 42 while it is bent downward along its entire width at 44 and flat at 45 to lie on top of a gage strip or upon a card as shown in Fig. 9, while at each side of the flat part 45 is a tang bent upward to ride upon a roller 47 carried by a carriage.

For each folder H, I provide at each end a folder spring 48 attached at one end to a folder, and at the other end to the top part of a carriage F in such a position that the spring members normally tend to keep each folding blade in engagement with the table and away from the guide rolls 47 either forward or back according to the direction of its advancing and receding motion.

Slidable on each table and extending from side to side thereof with each end resting in a recess such as 28 in a carriage F are guide strips 26 and 27, as shown in Figs. 5 and 6. Each set screw 31 rests on the end of one of these strips and with a recess 28 holds it in position. Each carriage F with bell crank G, and folder H is adjustable up and down and back and forth by set screws 31, 32, 33 on a rail 30, and guide strip 26 moves back and forth with it but not up and down on account of the depth of recesses 28.

It will be seen that when a strip of sample cloth K is placed between and on two folders H and a sample card L is placed on top thereof between guides 26 and 27, and when the bosses 40 are moved downward or toward the main shaft, the upper bell cranks G, G will be so moved that each shaft 42 and its blade H will be moved forward. This causes the tangs 46 to ride over rollers 47 lifting edges 45 with the cloth against springs 48, thus folding over the cloth on to the card as tangs 46 ride down on the inside of the guide rollers 47. After passing the dead centers of springs 48, the shafts 42, on account of the loose joint between them and holes 41 in the bell cranks or other blade carriers G, G are forced by the springs to the inside edges of holes 41 causing edge 45 to sharply move forward in a manner which smooths the projecting edge of cloth K along card L at the same time stretching it as shown in Figs. 7 and 8.

As the upper edges of card L have been covered with paste this smoothing and stretching process causes the paste to adhere and to hold the folded edges of the cloth smoothly in place after the folding blades have been withdrawn.

To get a frictional grip on the folded edges of cloth K, thereby to stretch it smoothly as the folders H move toward each other, I prefer to attach a strip of felt 49 to the bottom of each edge 45. I may substitute for flat edge 45 a U shaped holder 130 attached to holder H at 44, as shown in Fig. 15, and in this insert a projecting strip of felt 131.

It is evident that the folding blades H in connection with springs 48 and guide rollers 47 might be used with any suitable mechanism for moving them toward each other, but I prefer to have the loose motion described between shaft 42 and holes 41.

It is also clear that I could dispense with the guide plates 26 and 27, but I prefer to use these to guide the operator in placing the cloth and card, and also to prevent the finished card from following the folders H as they are being withdrawn, and thus perhaps catching under them or sticking to them and interfering with the removal or discharge of the finished card.

It is evident that the card might be held in place by the fingers or with a tool, but I prefer to use card holding means which comprises a central bar 50 held at each end by a swinging frame 51 carried near its middle part by arms 52 as shown in Figs. 1 and 2. These arms 52 are fixed to a shaft 53 revoluble in suitable bearings in brackets forming part of the standards B and C.

As shown in Figs. 10, 11, 12, each arm 52 has a pin 54, slidable in a slot 55 in an operating arm 56 which has an operating handle 57 and is pivoted to a standard at 58. Each arm 56 has a projection 59 between which and the shaft 53 is a hair-pin spring 60. The parts are so arranged that as shown in Figs. 10 and 12 when the handle 57 is brought forward beyond the dead center, the parts including bar 50 are held down on the adjoining table, and when they are raised or moved back beyond the dead center they are held by spring 60 out of the way and clear of the table so as to permit it to be revolved.

At one end which is shown as at the right and which I will call the operating end, there is pivoted loosely on bearing or pin 58 the gravity pawl or detent 61 which carries a set screw 62 in such position that when the parts are in card holding position, arm 56 is just above it.

This detent or pawl 61 is actuated by gravity so that its nose 63 will ride on the locking disk 64 carried by main shaft D and will drop into either slot 65 thus locking the main shaft against rotation.

This detent 61 also extends outward toward the right, and downward to form a releasing nose 66 which has a notch 67.

The card holding bar 50, by the pressure from spring 60, will hold the card L and cloth K on their center lines, but I prefer in connection therewith for the purpose of preventing the card from curling at the edges during the folding operation and of giving steadiness and firmness, to use the adjustable side bars 70 and 70 each of which is carried by a carrier nut 72 which rides on a right and left adjusting screw 73 by turning which the nuts 72 and bars 70 may be adjusted toward or from each other.

Each bar 70 as shown in Fig. 4 rides in a slot 74, in nut 72 and has an extension 71 which extends over the nut 72 and is engaged by a light spring 75 the other end of which bears against a stirrup 76 fixed to a nut 72 as shown. Being thus pressed downward by a spring 75 which is lighter than 60, these side bars hold the card less rigidly than the center bar and permit the cloth underneath to be pulled or stretched while the folding and smoothing is going on.

In order to permit the paste to dry slightly after the folding and to become set so that the cloth will not spring away I prefer to hold the folding means in position for a brief period and for this reason and for convenience in discharging, I prefer to use said two oppositely disposed tables 24 and 25, fixed to spiders 22 and 23 and revoluble with shaft D, and to locate between them means for operating the bell cranks G for the set of folding means with each table, of such character that when the folding means for the top table is operated to fold, those of the bottom table are so moved as to release a finished car and allow it to drop out as shown in Fig. 9.

To accomplish this purpose on the operating side, shown as the right, I use a shipper plate or means O, as shown in Figs. 2, 3, 6, 9, 17, and 18, having parallel grooves such as 80 and 81, as shown in Figs. 9, 17, and 18, each adapted to receive a boss 40 on a bell crank. I prefer to form each groove or channel 80 and 81 from sheet metal bent in suitable form and extended outward as a lip shown at 83 in Figs. 2 and 13.

The shipper means O shown is preferably held in position so that its grooves 80 and 81 may receive the bosses 40 on bell cranks G, G, G, G, by means of arms 86 yoked together at one end at 87 and pivoted to extensions 98 on spider 23, as shown in Figs. 1, 2, and 9. The other ends of arms 86 are pivotally connected to the middle of double ended bolts 84 and each end of each bolt carries a threaded sleeve 89 the end of which rests against a lip 83. Binding screws 90, 90 pass through each lip 83 into the end of a sleeve 89. By loosening the binding screws 90, and turning the sleeves 89, the distance between the grooves 80 and 81 of the shipper can be increased or diminished.

On the outside of each lip 83 adjoining each groove 80 and 81 in the shipper means, I locate a dog or hook 88 as shown in Figs. 2, 13, 14, 17, and 18 projecting toward the right in position to engage the shipper shifting means which consists of gravity lever 91, the short end or nose of which will ordinarily be lifted so as to be over the dog 88 of the table which is in the down position. Dog 88 may be adjusted by nuts 95, 96. The upward movement of the nose and downward movement of the tail is regulated by adjusting screw 92.

It is manifest that by lifting the tail 93 of this shifting means, its nose depresses a dog 88, forces the shipper means downward spreading outward the folding means of the bottom table and forcing together the folding means of the upper table whereby the top card cloth is folded and the bottom card is discharged.

For reducing the movements of the operator and for convenience, I prefer to use a handle P which is pivoted between the members of a fork 100 forming an extension on main shaft D. Handle P has a nose 101 which when raised is adapted to engage the tail 93 of the shipper shifting lever 91 and to then slip by it and immediately thereafter to engage the releasing nose 66 of the detent 61 of the card holding means, as shown in Figs. 13 and 18. It operates between the members of the fork 100, and also has suitable stops 102 to limit its movement.

I also provide a crescent guide R fixed to a standard C having horns 120 and 121 and a notch 122 at the bottom, of such form and in such position that when handle P is pressed downward and nose 101 rises lifting tail 93, as shown by the dotted lines in Figs. 2 and 17, and then nose 66, as shown in Figs. 13 and 18, which also raises detent 61 releasing locking disk 64 and forcing upward arm 56, overcoming the dead center of the card holding means and throwing them up out of the way, the operator by swinging handle P over as shown in Fig. 14, and by dotted lines in Fig. 18, will cause nose 101 to be guided around horn 121 until it drops into operative position at notch 122.

Handle P can be swung around either forward or back and it will be observed that as it is pressed down, nose 101 lifts and clears the tail of gravity lever 91, which falls back, then lifts nose 66 of detent 61 until it falls in to notch 67 which prevents it from falling back. It can only be cleared from notch 67 by being swung around on horn 120 or 121 into notch 122 which holds it in operative position.

As nose 101 clears it, detent 61 rides on disk 64 until a notch 65 comes around when it drops in and the tables are locked.

The central card holding bar being acted on by a strong spring holds the cloth and card firmly on the center line while the front and back bars being acted on by lighter springs permit the cloth to be stretched tightly and smoothly by the flexible sheet metal folding means. They help to prevent the card from curling and should be set as far from the center as possible without interfering with the folders.

For different widths of cards, bars 70 can be adjusted and carriages F can be adjusted without disturbing the throw of the bell cranks, while the throw of the bell cranks can be varied by changing the distance between grooves 80 and 81.

If the holes 41 are large enough, the bell cranks can be so adjusted that they serve merely to force the folding means over the tops of the folding rollers leaving the springs 48 to do the work, or they can be adjusted to give the folding blades a final push at the end of the stroke. In any case, I prefer that the folding means, should, in folding over the cloth, press it down onto the table and then move forward parallel with the table thus stretching and smoothing it into the desired position.

The folding means may include one or more folders such as H, and the means for causing the folding means, as it folds the cloth, to press it down on the table and to stretch and smooth it as the folding means moves parallel with the table is shown as the springs 48 in connection with the loose pivotal connection between each folder and the bell cranks which cause it to advance and recede.

The folding means should fall and advance to make the cloth stick to the card, but the rising action at the beginning of the movement is convenient. To properly stretch and smooth the cloth, the folder should frictionally grip it by means of a strip of felt 49, 131, or other equivalent device.

The loose action of the folding blades is desirable as it is easier to adjust than a tight action would be.

These folding blades are normally parallel with the table with which they coöperate and are preferably so loosely mounted between the members of a set of carriers, such as the bell cranks, as to permit motion parallel with the table.

In Fig. 16, I show how four tables can be operated by using a gear 140 fixed to standard B with shaft D passing through its center. Gear 140 engages gear 141 revoluble on table carrying spider arm 142 and gear 141 engages gear 143 fast on shaft D. By a well known principle, a half turn of shaft D will turn gear 141, arm 142 and the tables 144 a quarter turn. The other spider 145 is loose on shaft D.

With this gearing and connections, four tables with folding means and a shipper 146 with four channels can be used, with no change in the card holding means, handle, etc.

In the simplified construction shown in Figs. 17 and 18 all adjustments are omitted, the machine being suitable for use with stiff cards of uniform size. The rails, carriages, folding blades and springs, guide strips, set screw 62, adjusting screw 92, arms and yoke are all omitted. The shifter plate is shown as made of sheet metal without adjustments and is held in place by the bosses on the bell cranks and a slot 150 through which shaft D passes.

The spiders and tables are revoluble with shaft D and carry with them bell cranks G which are fixed on the ends of shafts 34, 35, 36, 37 which pass through and are revoluble in suitable bearings in the spiders 22 and 23. There are two bell cranks on each side of each table or eight altogether. At its right and left end, a bell crank is fixed to each shaft and pivoted loosely in a hole therein, is a shaft 42 which is part of a folder. We may call these, top front and top back and bottom front and bottom back folding means according to which table is uppermost. When the top folding means move toward each other or toward the center, they fold the cloth over the front and back edges of a card which rests on the top table and the action is such that as the top folding means move toward the center to fold, the bottom folding means move away from the center thereby releasing the finished card which is at the bottom.

To operate the bell cranks and folding means, I use at the right side of the machine a shipper plate O which in Figs. 17 and 18 is shown as made of sheet metal with grooves 80 and 81 into which project bosses 40 which extend from the other arms of all the bell cranks on the right side of the machine.

Plate O is kept in place by these bosses and slot 150 through which shaft D passes. At its top and bottom, plate O has a dog 88 which, when at the bottom, passes under the nose of a gravity lever 91. By pressing up the tail of this lever, plate O is brought down from the full line position to the dotted line position in Fig. 17 thus moving toward each other the top folding means and away from each other the bottom folding means as shown by the dotted lines. To press up the tail of lever 91, I use a handle P pivoted between the members of a fork 100 which projects from shaft D. This has a nose 101 which normally extends under the tail of lever 91 as shown by the full lines in Fig. 17.

The card holding means to be described in detail is operable on the dead center principle so that when brought down on the card by hand, it is held in place by a spring and when pushed up by the operation of the machine, it stays out of operation until again brought down by hand.

When handle P is brought down, it lifts the tail and depresses the nose of lever 91 operating the folding mechanism as explained. Its continued movement causes nose 101 to engage and lift gravity pawl 61 which is loosely pivoted to the frame in position to normally lock the shaft D, spiders and tables against rotation and to be under the card holding means when such means is in holding position. As nose 101 lifts the pawl, it therefore also lifts the card holding means, as shown by the full lines in Fig. 18, and pushes it back over the dead center where it remains out of action. When the card holding means is lifted, shaft D, spiders 22 and 23, tables 24 and 25, bell cranks G, and shipper plate O can all be revolved so as to bring the bottom parts to the top by moving handle P around in a half circle guided by crescent guide R, as shown by the dotted lines in Fig. 18 and as described more in detail hereafter.

I claim:

1. The combination in a folding machine, of a table, blade carriers adapted to advance and recede, a blade loosely mounted between the carriers, and guides for raising the blade and allowing it to fall as it advances, with springs in engagement with the blade adapted to press it toward the table and away from the guides in the direction of its advancing and receding motion.

2. In a folding machine, the combination of a frame, a table carried thereby, two sets of carriers pivotally mounted in the frame, folding blades normally parallel with the table each so loosely mounted between the members of a set of carriers as to permit motion parallel with the table, spring members which normally tend to keep the blades in engagement with the table, and guides so arranged as to cause the blades to rise and fall as they advance and recede by the action of the carriers.

3. The combination in a folding machine, of a base, with standards fixed thereto, a main shaft revoluble between the standards, and oppositely disposed tables carried by the shaft, folding means in operative relation with each table and revoluble with it, card holding means carried by the standards manually operative to engage a card on a table, shipper plates coöperating with said folding means and so arranged between the tables that their movements will advance one set of folding blades and retract the other, together with means for operating the shipper plates and immediately thereafter releasing the card holding means.

4. In a folding machine, a card receiving table, parallel front and rear folding means which extend from side to side thereon and are adapted to move toward and from each other parallel with the table, spring pressed card holding means having a central bar adapted to engage a card on the table midway between the folding means, front and rear card holding bars carried by the card holding means parallel with the central bar and adjustable toward and from it, and light springs carried thereby which keep the front and rear bars in engagement with the card, means for moving the folding means toward and from each other, and connections operative by the last named means for releasing the card holding bars after the folding means have advanced.

5. In a folding machine, a card receiving table, parallel front and rear folding means which extend from side to side thereon and are adapted to move toward and from each other parallel with the table, a retractile card holding bar adapted to hold a card in place on said table, means for moving the folding means toward and from each other, and connections operative by the last named means for releasing the card holding bar after the folding means have advanced.

6. In a folding machine, the combination of a base having standards at each side, bearings therein, a shaft revoluble in the bearings, oppositely disposed card receiving tables carried by the shaft, folding means carried by the shaft and in operative relation with each table, and card holding means supported by the standards, with devices for operating the top folding means and at the same time releasing the bottom folding means, devices for immediately thereafter releasing the card holding means, and a handle for rotating the shaft and tables.

7. In a folding machine, the combination of a base having standards at each side, bearings therein, a shaft revoluble in the bearings, oppositely disposed card receiving tables carried by the shaft, folding means carried by the shaft and in operative relation with each table, a card holding means supported by the standards, a handle pivoted at the end of the shaft, devices operable by the movement of the handle on its pivot for operating the top folding means and at the same time releasing the bottom folding means, and by its continuous pivotal movement adapted to disengage the card holding means.

8. The combination in a folding machine, of a table, blade carriers adapted to advance and recede, a blade pivotally mounted between the carriers, and guides for raising the blade and allowing it to fall as it advances.

9. The combination in a folding machine, of a table, blade carriers adapted to advance and recede, a blade pivotally mounted between the carriers, and guides for raising the blade and allowing it to fall as it advances together with means for holding a card in position on the table while the folding means are operating.

10. In a folding machine, the combination of a base having standards at each side, bearings therein, a shaft revoluble in the bearings, oppositely disposed card receiving tables carried by the shaft, folding means carried by the shaft and in operative relation with each table, a card holding means supported by the standards, locking means for the tables, a handle pivoted at the end of the shaft having a nose adapted to operate the top folding means and to release the bottom folding means, and by its continuous pivotal movement to unlock the tables and to disengage the card holding means, and a crescent guide carried by a standard in such position as to guide the nose of the handle back to its initial position as the handle is revolved with the shaft.

11. The combination in a folding machine, of a table, carriers adapted to advance and recede, folding means loosely mounted between the carriers, means for causing the folding means to fall as it folds the cloth, and springs so positioned as to press the folding means down on the table and to cause it to move parallel with the table to stretch and smooth the cloth.

12. The combination in a folding machine, of a table, folding means adapted to advance and recede, means carried by the folding means to frictionally engage the cloth, and means for causing the folding means, as it folds the cloth, to press it down on the table and to stretch and smooth it as the folding means moves parallel with the table.

In testimony whereof I affix my signature.

HENRY F. PERKINS.

Copies of this patent may be obtained for five cents each, by addressing the "Commissioner of Patents, Washington, D. C."